UNITED STATES PATENT OFFICE.

JULIUS BRÖNNER AND HERMANN GUTZKOW, OF FRANKFORT-ON-THE-MAIN, PRUSSIA.

IMPROVEMENT IN PREPARING COLORING MATTERS FROM ANTHRACENE.

Specification forming part of Letters Patent No. 97,597, dated December 7, 1869; reissue No. 4,558, dated September 19, 1871.

*To all whom it may concern:*

Be it it known that we, JULIUS BRÖNNER and HERMANN GUTZKOW, both of Frankfort-on-the-Main, in the Kingdom of Prussia, have invented a certain Process for Preparing Coloring Matter from Anthracene, of which the following is a specification:

By means of oxidation or substitution we transform anthracene into a new product. For this purpose we employ any known means of oxidation capable of causing this alteration—for example, nitric acid, or bichromate of potassa and sulphuric acid, or bichromate of potassa and acetic acid.

We purify this new product either by crystallization or by sublimation, or in any other way; and by nitration of the said product, and by further treatment with alkalies, we prepare the coloring matter. We also prepare the coloring matter directly from the unpurified product; in which case we treat the said product with nitric acid, or with a mixture of nitric acid and sulphuric acid, or a mixture of nitrates and sulphuric acid. When the new product is formed we heat it with alkalies.

We usually operate in the following way: We heat anthracene with double its weight of nitric acid of 1.2 to 1.3 specific gravity, wash the new product with water, and purify it by sublimation; or, we mix one part of anthracene with two parts of bichromate of potassa and add two and one-half parts of sulphuric acid diluted with from four to five times its weight of water. We accelerate the process by aid of steam, wash the new product with water, and purify it by sublimation, or in any other way.

We mix the compound obtained in either of these two ways, and called "oxanthracene" or "anthraquinone," with four times its weight of sulphuric acid, and we then add one part of nitric acid, specific gravity 1.3 to 1.4. We accelerate the process by aid of steam, wash the new product with water, and heat it with a concentrated solution of caustic alkali, either potash or soda, or a mixture of both, up to 220° centigrade. We then dissolve by water and precipitate the coloring matter (usually called "alizarine") by an acid—for instance, sulphuric acid or muriatic acid.

Our process differs from that known as Messrs. Caro, Gralbe, and Liebermann's, insomuch that they substitute hydrogen by twice $SO_3$ H, and afterward $SO_3$ H by twice HO, while we substitute hydrogen by $NO_2$ and eliminate, afterward, nitrogen in form of ammonia by means of alkalies.

We would have it distinctly understood that we do not confine ourselves to any precise or relative proportions of substances, nor restrict ourselves to operating at any particular temperature, the proportions and degrees of heat above given being only such as we have in practice found very suitable, but they, necessarily, vary with the quality of the ingredients and other circumstances.

We claim as our invention—

The preparation of coloring matter by nitrating the product which we obtain from anthracene by oxidation (oxanthracene) and the further treatment with alkalies, substantially as described.

JULIUS BRÖNNER.
HERMANN GUTZKOW.

Witnesses:
VALENTIN KERTELL,
GEORG SARTORI.

(80.)